A. H. Hook.
Collar Machine.

No. 21.10. Reissued. Nov. 21. 1865.

Witnesses
H. L. Schmidt
Robt. F. Macoy

Albert H. Hook.

UNITED STATES PATENT OFFICE.

GEORGE W. RAY AND VARNUM N. TAYLOR, OF SPRINGFIELD, MASSACHUSETTS, ASSIGNEES OF ALBERT H. HOOK.

IMPROVEMENT IN APPARATUS FOR FOLDING PAPER COLLARS.

Specification forming part of Letters Patent No. 46,669, dated March 7, 1865; Reissue No. 2,056, dated August 22, 1865; Reissue No. 2,110, dated November 21, 1865.

*To all whom it may concern:*

Be it known that we, GEORGE W. RAY and VARNUM N. TAYLOR, of Springfield, in the county of Hampden and State of Massachusetts, have become sole owners, by assignment from ALBERT H. HOOK, of the city, county, and State of New York, of a new and useful Machine for Folding or Creasing Paper Collars; and we do hereby declare the following to be a full and exact description thereof, reference being had to the annexed drawings and letters of reference marked thereon.

Figure 3:
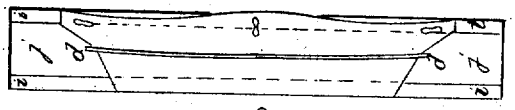
Figure 4:
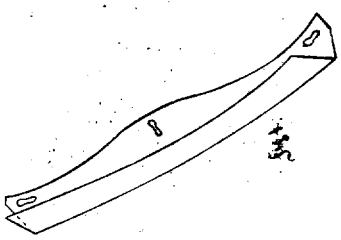
Figure 1:
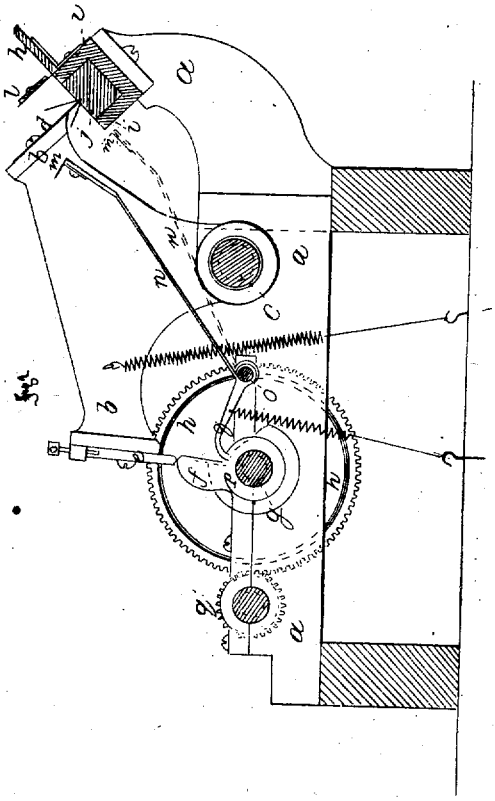
Figure 2:
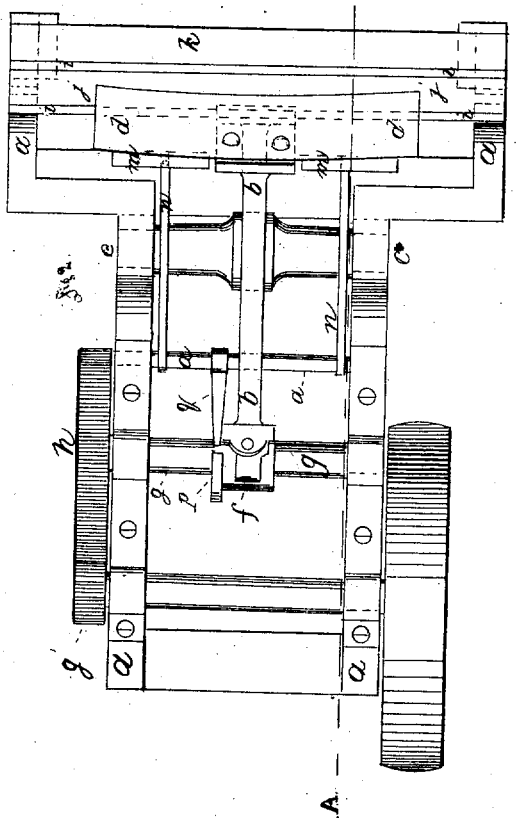

In these drawings, Figure 1 represents a vertical section in line A B of Fig. 2. Fig. 2 is a plan view of the complete machine. Fig. 3 is a plan of the box containing the elastic material with a collar placed thereon and the edge of the blade which makes the crease. Fig. 4 is a perspective view of a collar when folded.

The machine consists of a suitable frame, *a a*, in which is pivoted a strong lever, *b b*, its journals being at *c c*. At one end of this lever there is a strip of sheet-steel, *d*, the lower edge of which is made sharp. The other end of the lever is fitted with a steel piece, *e*, which bears upon a cam, *f*, and is made adjustable up and down for the purpose of changing the dip of the blade *d*. The cam *f* is attached to a horizontal shaft, *g*, having its bearings in the sides of frame *a a*, and is driven by a pinion, *g'*, gearing into a cog-wheel, *h*, or by any other suitable means. The box *i*, containing the elastic material *j*, is also supported by the sides of frame *a*, and may be placed in an inclined position, so as to facilitate the feeding in of the collars, and also their discharge, as they will drop out of the machine without any additional mechanism when this is inclined. Platform K is fastened to the front of said box *i*, and a guard, *l*, in front of the blade may be placed there to prevent the operator from getting his fingers accidentally under the blade.

Immediately behind the box *i*, containing the elastic material, there are two gages, *m m*, against which the back edge of the collar rests previous to the descent of the blade. These gages, being adjustable back and forward, determine the locality of the fold in the collar, and being attached by arms *n n* to a rock-shaft, *o*, receive a motion upward immediately after the folding operation has taken place, so as to afford the folded collar the necessary space to drop or be taken out of the machine. This up motion is obtained from a cam, *p*, operating an arm, *q*, on rock-shaft *o*.

In Fig. 1 the gages are shown in red lines in their proper position for feeding the collar under the blade, and in black lines in their elevated position, when the folded collar is required to drop or be taken out.

Having now fully described the invention, what we claim therein as new, and desire to secure by Letters Patent, is—

1. Indenting and folding the collar by means of a blade or folder upon a yielding or cushioned surface, substantially as herein described and set forth.

2. The yielding or cushioned folding surface, whether in an inclined or other position, on which the blade acts in folding, as herein described, in combination with the gages *m*, substantially as and for the purposes set forth.

GEO. W. RAY.
VARNUM N. TAYLOR.

Witnesses:
THEODORE A. CURTIS,
SILAS L. KENYON.